2 Sheets--Sheet 1.

S. S. HOOVER.
Attachment to Coffee-Pots.

No. 168,253. Patented Sept. 28, 1875.

Attest:
Charles Thurman
O. R. P. Dyer.

Inventor
Samuel S. Hoover.
by Geo. W. Dyer & Co
Attys.

2 Sheets--Sheet 2

S. S. HOOVER.
Attachment to Coffee-Pots.

No. 168,253. Patented Sept. 28, 1875.

Attest
Charles Thurman

Inventor.
Samuel S. Hoover
by Geo. W. Dyer & Co
Attys.

UNITED STATES PATENT OFFICE.

SAMUEL S. HOOVER, OF ALDERSON, WEST VIRGINIA, ASSIGNOR TO HIMSELF AND ANDREW J. JONES, OF SAME PLACE.

IMPROVEMENT IN ATTACHMENTS TO COFFEE-POTS.

Specification forming part of Letters Patent No. 168,253, dated September 28, 1875; application filed August 27, 1875.

*To all whom it may concern:*

Be it known that I, SAMUEL S. HOOVER, of Alderson, in the county of Monroe and State of West Virginia, have invented a new and useful Improvement in Condensing Attachment to Coffee-Pots; and I do hereby declare that the following is a full and exact description of the same, reference being had to the accompanying drawings and to the letters of reference marked thereon.

The object I have in view is the production of a condensing attachment which can be used with common coffee-pots without alteration of the same, and which shall so condense the steam and convey it back to the inside of the vessel that almost all of the aroma of the coffee is preserved and a better drink secured than that made by the common coffee-pot; and my invention therein consists in a vessel having tapering sides and a top-flanged rim capable of being set into the top of a common coffee-pot, and filled with cold water, which is provided with a coil of pipe with one end opening into said coffee-pot, and the other above the water in said vessel; and, further, in several details of construction, all as more fully hereinafter explained.

To enable others skilled in the art to manufacture my device, I proceed to describe the same in connection with the drawings, in which—

Figure 1:
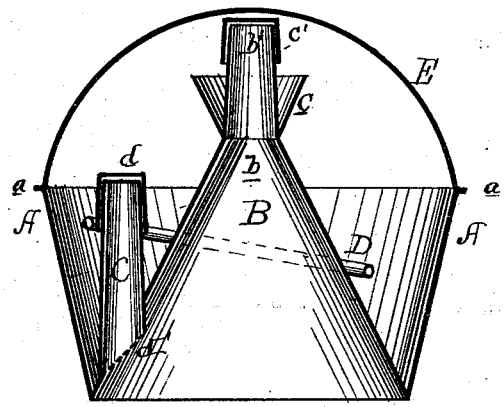
Figure 2:
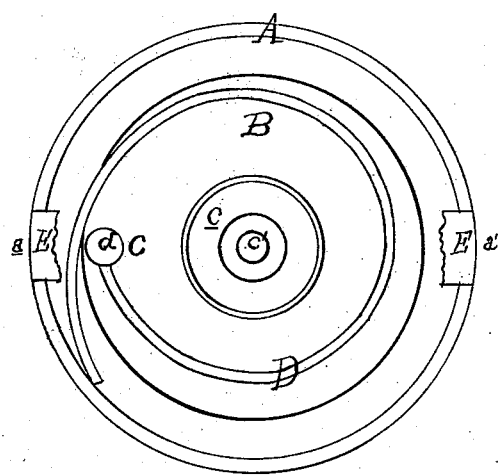
Figure 3:
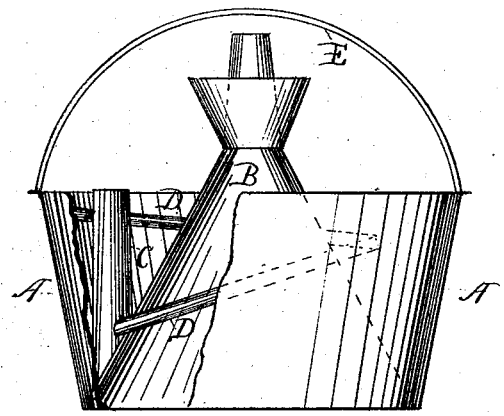

Figure 1 is a central section; Fig. 2, a top elevation with the handle removed; and Fig. 3 is a side elevation of my device with a part of one side of the vessel broken away.

Like letters represent corresponding parts in each figure.

A represents the sides of the condensing-vessel circular in outline and tapering from top to bottom. A supporting-rim, $a$, runs around its top. The bottom of this vessel is a cone, B, whose base is connected to the bottom of the sides, and whose vertex $b$ rises above the top rim $a$ of the vessel. The vertex $b$ of the cone is truncated, so as to leave an aperture, $b'$. A drip-cup, $c$, is soldered onto the cone a short distance below the aperture. A weighted cap, $c'$, of the same shape as the top of the cone is placed over it, covering the aperture. C is a vertical pipe, which rises from the cone B, near its point of connection with the sides A, to about the height of the rim $a$. This pipe is provided with a weighted cap, $d$. A wire-gauze, $d'$, covers the bottom of the pipe C where it opens through the cone B. D is a coil of pipe opening through the side of the pipe C near its bottom, and consequently below the water contained in the vessel, passing around the cone B as many times as desired, and having its upper open end secured to the inside of the vessel near its top and above the water-surface. E is a handle, soldered to the vessel and extending over the cap $c'$ near enough to said cap to allow it to be partially raised, but not entirely removed.

The operation of my device is as follows: The vessel is nearly filled with water and set into the top of a common coffee-pot, which has its spout fitted with a plug or covered by a weighted cap. By the tapering side and the top-flanged rim this vessel will fit coffee-pots having tops of different dimensions. The steam arising in the cone is condensed; but when more steam is generated than can be readily condensed by the cone, it passes up through the pipe C into the coil D, where it is condensed and runs back into the coffee-pot. When the pressure of the steam in the cone overcomes the weight of the cap $c'$ it lifts the cap off of its seat, and thus leaves openings through which the surplus steam escapes, the steam being condensed as it passes down between the cap and the top B of the cone, the drip falling into the cup $c$. The handle E prevents the cap $c'$ from being lifted entirely off from its seat. When the pressure in the pipe C is too great it is relieved by the lifting of the cap $d$.

The surplus steam which escapes through the weighted caps of my device is a very small amount when compared to the large quantity of steam continually issuing from the spout and cover of the common coffee-pot.

Having thus described my invention, what I claim as new, and desire to secure by Letters Patent, is—

1. In a condensing attachment for coffee-pots, the combination of a vessel adapted to hold water, having an open top, sides tapering downwardly and inwardly in a straight line, and a top-flanged rim, the said vessel being adapted to fit coffee-pots of various sizes, with a coil of pipe whose upper open end is secured near the top of said vessel, substantially as described and shown.

2. In a condensing attachment for coffee-pots, the combination of a vessel adapted to hold water, having an open top, sides tapering downwardly and inwardly in a straight line, and a top-flanged rim, with a cone composing the entire bottom of the vessel, and a coil of pipe whose upper open end is secured near the top of said vessel, substantially as described and shown.

3. In a condensing attachment for coffee-pots, the combination of a vessel having an open top, tapering sides A, and top-flanged rim $a$ with the coil of pipe D, pipe C, cone B, cap $c'$, and handle E, substantially as described and shown.

4. The condensing attachment for coffee-pots described, consisting of a vessel having tapering sides A, top rim $a$, and handle E, the cone B, having the cap $c'$, the pipe C, having the cap $d$, and the coil of pipe D, all constructed and arranged substantially as described and shown.

This specification signed and witnessed this 21st day of July, 1875.

SAMUEL S. HOOVER.

Witnesses:
　W. Y. IRONS,
　JUDSON SKAGGS.